(12) United States Patent
Ryu et al.

(10) Patent No.: US 8,121,087 B2
(45) Date of Patent: Feb. 21, 2012

(54) METHOD OF PROVIDING INFORMATION OF NEIGHBOR BASE STATION BY MOBILE SUBSCRIBER STATION IN BROADBAND WIRELESS ACCESS SYSTEM

(75) Inventors: Ki Seon Ryu, Seoul (KR); Chang Jae Lee, Chungcheongnam-do (KR); Yong Suk Jin, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 597 days.

(21) Appl. No.: 11/568,938

(22) PCT Filed: May 10, 2005

(86) PCT No.: PCT/KR2005/001360
§ 371 (c)(1),
(2), (4) Date: Oct. 14, 2008

(87) PCT Pub. No.: WO2005/107378
PCT Pub. Date: Nov. 17, 2005

(65) Prior Publication Data
US 2009/0052428 A1  Feb. 26, 2009

(30) Foreign Application Priority Data

May 10, 2004  (KR) .................. 10-2004-0032751
May 10, 2004  (KR) .................. 10-2004-0032754

(51) Int. Cl.
*H04W 4/00* (2009.01)
(52) U.S. Cl. ......... 370/331; 370/332; 370/350; 455/436
(58) Field of Classification Search .................. 370/350, 370/331, 332; 455/436
See application file for complete search history.

(56) References Cited

U.S. PATENT DOCUMENTS 6,490,446 B1 * 12/2002 Haartsen .................... 455/422.1
(Continued)

FOREIGN PATENT DOCUMENTS

JP  7-288858  10/1995
(Continued)

OTHER PUBLICATIONS

Sohyun, K. et al.: "IEEE 802.16e Reporting of Scanning Result." IEEE 802.16 Broadband Wireless Access Working Group, IEEE 802.16e-03/30, May 13, 2003.

(Continued)

*Primary Examiner* — Jinsong Hu
*Assistant Examiner* — Qun Shen
(74) *Attorney, Agent, or Firm* — Lee, Hong, Degerman, Kang & Waimey (57) ABSTRACT

A method of providing neighbor base station information via a mobile subscriber station in a broadband wireless access system is disclosed. In providing neighbor base station information (S316) to a serving base station from a mobile subscriber station in a broadband wireless access system, the present invention includes the steps of performing a scanning and a synchronization (S312, S313) on a mobile base station based on information provided from the serving base station (S311) and transmitting the neighbor base station information acquired from the scanning and the synchronization to the serving base station (S316) regardless of a presence or non-presence of a request from the serving base station. Accordingly, the present invention can efficiently transmit the neighbor base station signal intensity and frame information acquired by the mobile subscriber station.

5 Claims, 7 Drawing Sheets

U.S. PATENT DOCUMENTS

| | | | |
|---|---|---|---|
| 7,006,828 B1 * | 2/2006 | Czaja et al. | 455/442 |
| 7,215,923 B2 * | 5/2007 | Hillyard | 455/41.1 |
| 7,606,189 B1 * | 10/2009 | Lee et al. | 370/328 |
| 2003/0179731 A1 * | 9/2003 | Noguchi et al. | 370/331 |
| 2005/0197126 A1 * | 9/2005 | Kang et al. | 455/442 |
| 2005/0286470 A1 * | 12/2005 | Asthana et al. | 370/331 |
| 2007/0258405 A1 * | 11/2007 | Kim et al. | 370/331 |

FOREIGN PATENT DOCUMENTS

| | | |
|---|---|---|
| JP | 2003-348007 | 12/2003 |
| WO | 00/62438 | 10/2000 |
| WO | 01/20942 | 3/2001 |
| WO | 2004/098211 | 11/2004 |

OTHER PUBLICATIONS

Kitroser, I.: "IEEE 802.16e Handoff Draft," IEEE 802.16 Broadband Wireless Access Working Group, IEEE C802.16e-03/20r1, Mar. 13, 2003.

* cited by examiner

METHOD OF PROVIDING INFORMATION OF NEIGHBOR BASE STATION BY MOBILE SUBSCRIBER STATION IN BROADBAND WIRELESS ACCESS SYSTEM

CROSS-REFERENCE TO RELATED APPLICATIONS

This application is the National Stage filing under 35 U.S.C. 371 of International Application No. PCT/KR2005/001360, filed on May 10, 2005, which claims the benefit of earlier filing date and right of priority to Korean Application No. 10-2004-0032751, filed on May 10, 2004, and Korean Application No. 10-2004-0032754, filed on May 10, 2004.

TECHNICAL FIELD

The present invention relates to a broadband wireless access system, and more particularly, to a method of providing neighbor base station information via a mobile subscriber station in broadband wireless access system, in which the mobile subscriber station acquires signal intensity and frame information of a neighbor base station to transmit the acquired information to a serving base station.

BACKGROUND ART

Figure 1:
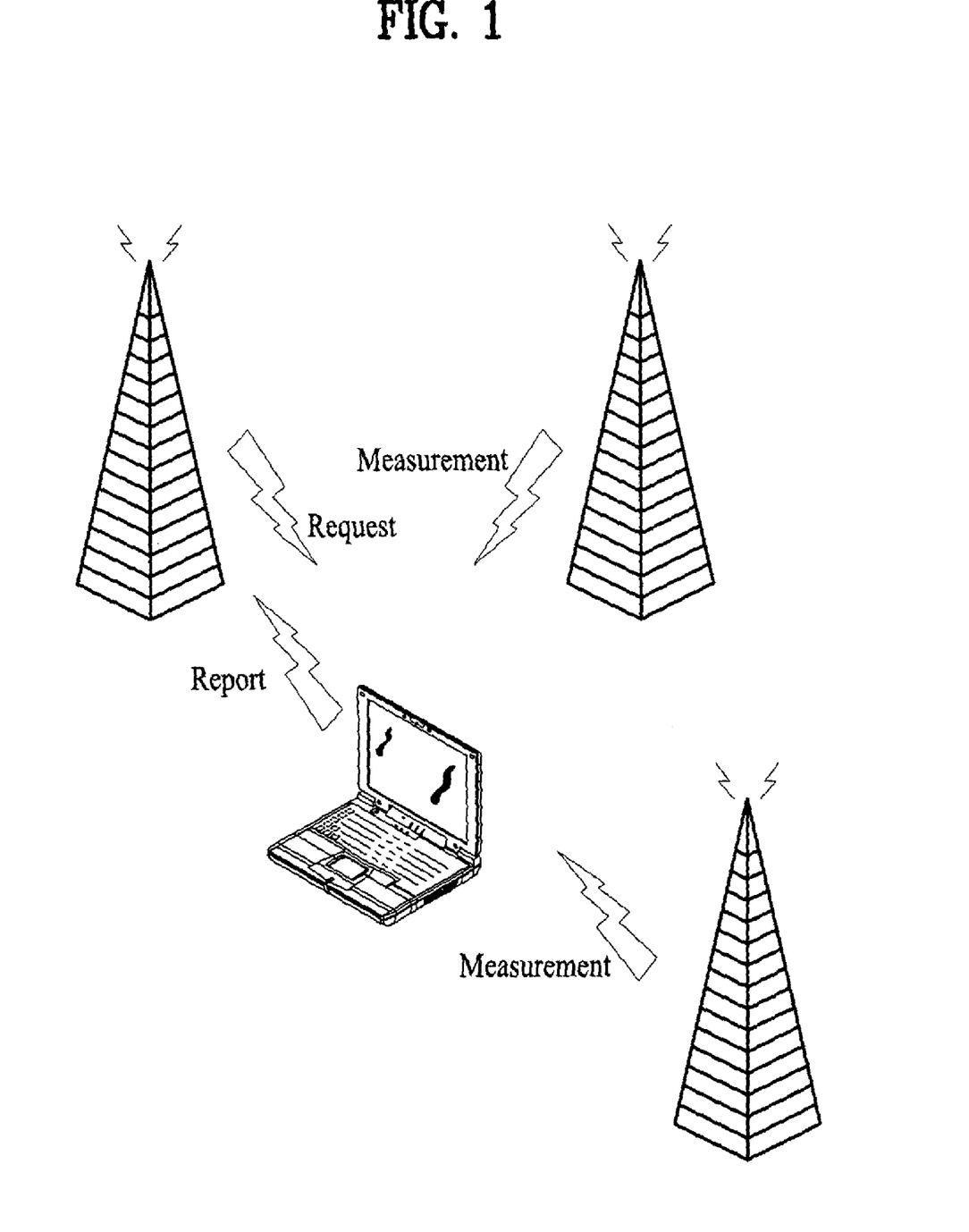
FIG. 1 is a diagram for a method of transmitting neighbor base station information of a mobile subscriber station to a serving base station according to a related art.

FIG. 1 is a diagram for a method of transmitting neighbor base station information of a mobile subscriber station to a serving base station according to a related art.

Referring to FIG. 1, a mobile subscriber station (MSS) 11 measures signals of neighbor base stations 12 and 13 and then transmits the corresponding results to a serving base station 14. In doing so, the mobile subscriber station transmits the measured information to the serving base station only if there exists a request from the serving base station.

Namely, to know a downlink channel status between the neighbor base station and the mobile subscriber station, the serving base station should request a transmission of the information of the neighbor base station from the mobile subscriber station. And, the mobile subscriber station transmits the information of the neighbor base station using a corresponding message.

However, a method of transmitting the neighbor base station information from the mobile subscriber station is not provided yet.

For instance, the mobile subscriber station transmits a measurement report according to a command of a base station. In a situation of collecting frame information of the neighbor base station, all mobile subscriber stations can provide the frame information according to a request made by the base station. Yet, in case of a base station that collects the frame information of the neighbor base station from the mobile subscriber station having the event of handover or scanning, it may occur that the base station looks for a mobile subscriber station having collected the latest information to ask for the latest information. Besides, it is not decided yet that the mobile subscriber station transmits the neighbor base station information to the serving base station using what kind of message.

DISCLOSURE OF THE INVENTION

Accordingly, the present invention is directed to a method of providing neighbor base station information via a mobile subscriber station in broadband wireless access system that substantially obviates one or more of the problems due to limitations and disadvantages of the related art.

An object of the present invention is to provide a method of providing neighbor base station information via a mobile subscriber station in broadband wireless access system, by which the mobile subscriber station transmits the acquired information associated with the neighbor base station to a serving base station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in providing neighbor base station information to a serving base station from a mobile subscriber station in a broadband wireless access system, a neighbor base station information providing method according to the present invention includes the steps of performing a scanning and a synchronization on a mobile base station based on information provided from the serving base station and transmitting the neighbor base station information acquired from the scanning and the synchronization to the serving base station regardless of a presence or non-presence of a request from the serving base station.

Preferably, the neighbor base station information is transmitted to the serving base station via a dedicated message to a transmission of the neighbor base station information. More preferably, the dedicated message includes a medium access control (MAC) management message.

Preferably, in the neighbor base station information transmitting step, the neighbor base station information is transmitted to the serving base station in case that a specific event takes place. More preferably, the event is a handover request message transmission to the serving base station.

Preferably, the neighbor base station information providing method further includes a step of transmitting a handover request message, wherein after transmitting the handover request message, the neighbor base station information acquired from the scanning and the synchronization to the serving base station regardless of the presence or non-presence of the request from the serving base station.

Preferably, the neighbor base station information includes a signal intensity and frame information of the corresponding neighbor base station.

To further achieve these and other advantages and in accordance with the purpose of the present invention, in providing neighbor base station signal intensity information to a serving base station from a mobile subscriber station in a broadband wireless access system, a neighbor base station signal intensity information providing method includes the steps of allowing a mobile subscriber station to receive information for a cycle to report a signal intensity of a neighbor base station from the serving base station, measuring a received signal intensity corresponding to at least one neighbor base station via scanning and synchronization, and transmitting the measured signal intensity information to the serving base station according to the cycle via a dedicated message.

To further achieve these and other advantages and in accordance with the purpose of the present invention, in a broadband wireless access system, in which a base station acquires neighbor base station information from a mobile subscriber station, a neighbor base station information providing method includes the steps of transmitting information of scanning and synchronization sections to be performed on a neighbor base station to the mobile subscriber station and receiving the neighbor base station information from the mobile subscriber station using a dedicated message to a transmission of the neighbor base station information regardless of a request of the neighbor base station information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 2:
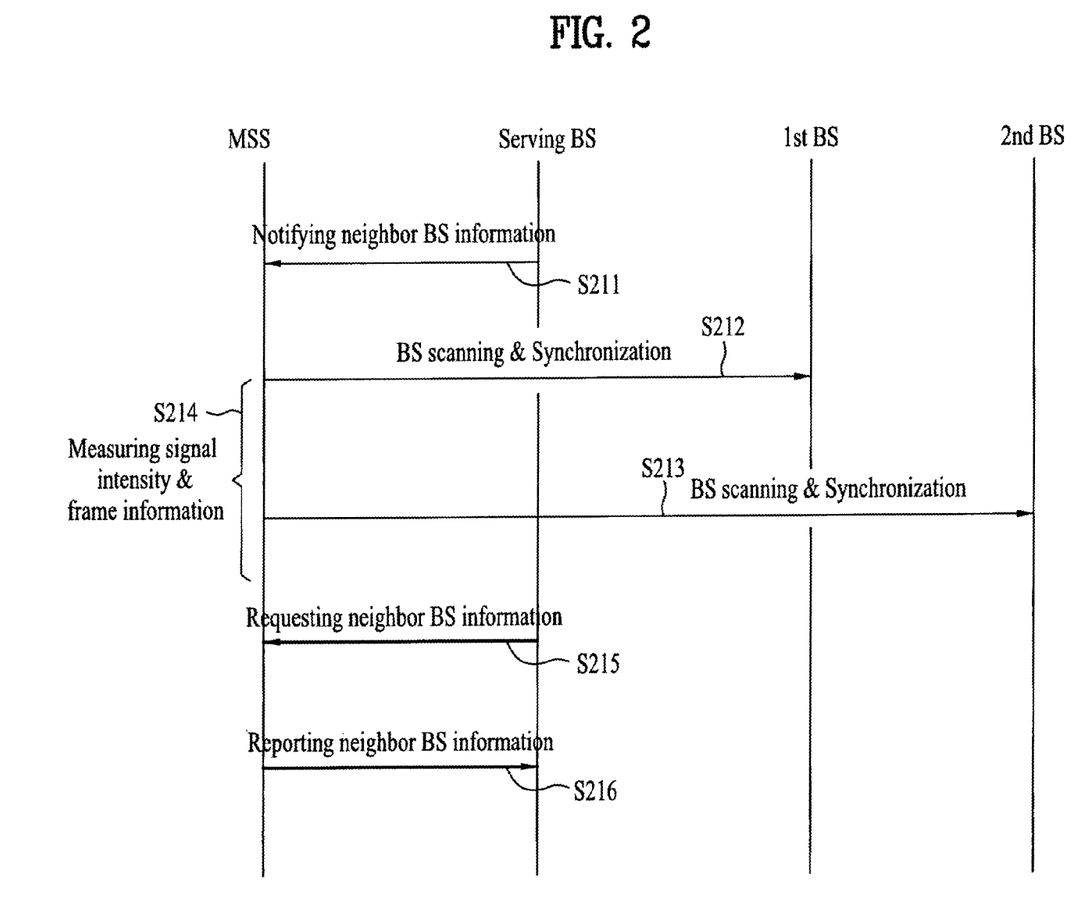
FIG. 2 is a flowchart of a neighbor base station information reporting method of a mobile subscriber station.

FIG. 2 is a flowchart of a neighbor base station information reporting method of a mobile subscriber station.

Referring to FIG. 2, a serving base station transmits information about neighbor base stations in the form of a broadcast to mobile subscriber stations within an area (S211).

The mobile subscriber station performs scanning and synchronization of the neighbor base station (S212, S213) and then acquires signal intensity and frame information of the neighbor base station (S214). In case that there exists a neighbor base station information request from the serving base station (S215), the mobile subscriber station transmits the neighbor base station information to the serving base station (S216).

For a connection to a base station having the biggest size of the signal at its location, the mobile subscriber station measures the signal intensity of the neighbor base station according to an instruction of the serving base station. Thus, in case of finding out the base station meeting the signal size equal to or greater than a predetermined reference while measuring the signals of the neighbor base stations, the mobile subscriber station provides the measured information to the serving base station.

Figure 3:
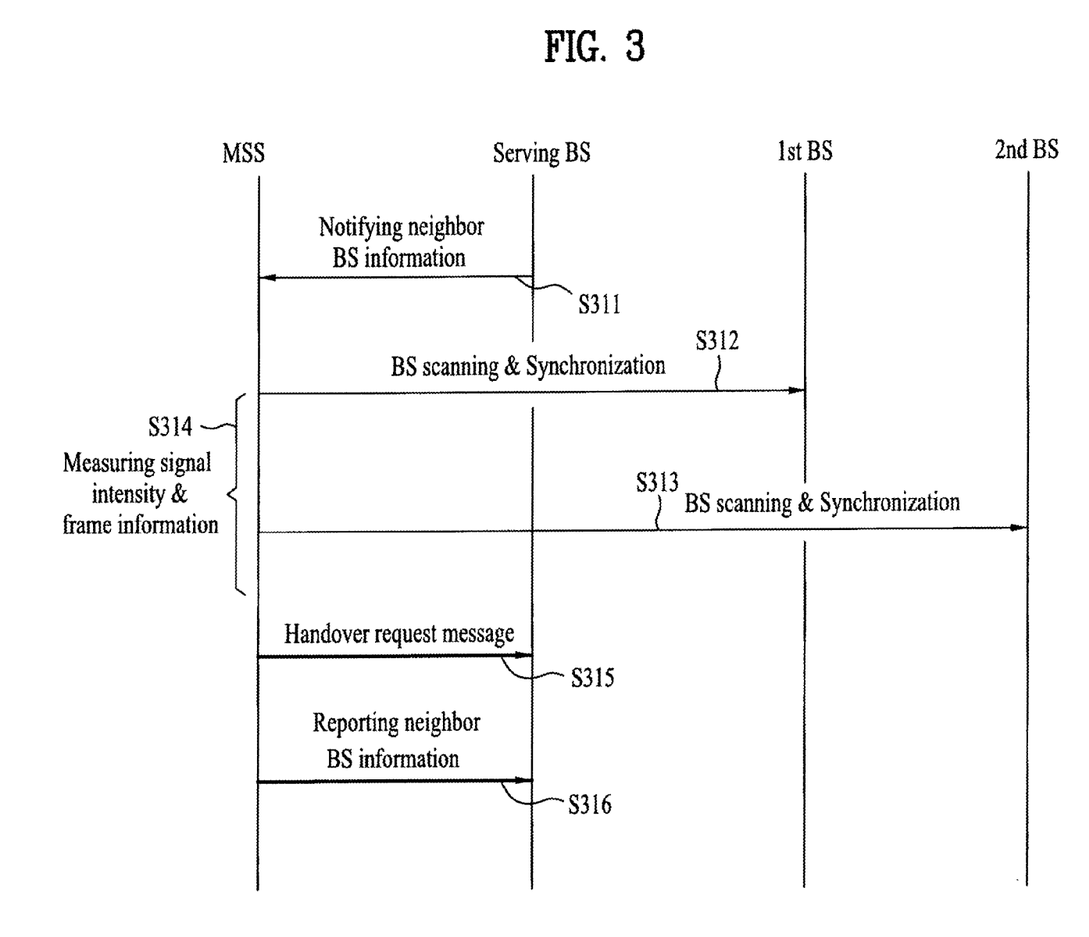
FIG. 3 is a flowchart of a neighbor base station information reporting method of a mobile subscriber station according to one embodiment.

FIG. 3 is a flowchart of a neighbor base station information reporting method of a mobile subscriber station according to one embodiment.

Referring to FIG. 3, a serving base station transmits information about neighbor base stations in the form of a broadcast to mobile subscriber stations within an area (S311).

The mobile subscriber station performs scanning and synchronization of the neighbor base station (S312, S313) and then acquires signal intensity (CINR: carrier to interface noise ratio) and frame information of the neighbor base station (S314). The mobile subscriber station stores the neighbor base station information acquired via the measurement. The mobile subscriber station then reports the measurement result to the serving base station regardless of a request from the serving base station. Specifically, in case of transmitting a handover request message to the serving base station (S315), the mobile subscriber station can transmit the measurement report to the serving base station before and after the transmission of the handover request message (S316).

An example of a neighbor base station information providing message is shown in Table 1.

TABLE 1

| Syntax | Size | Notes |
|---|---|---|
| MSS-NBR-REP_Message_Format( ) { | | |
| Management Message Type=? | 8 bits | |
| N_NEIGHBORS | 24 bits | |
| For(j=0; j<N_NEIGHBORS; j++) { | | |
| Neighbor BS-ID | 48 bits | |
| Physical Frequency | 32 bits | |
| TLV Encoded Neighbor Information | Variable | RLV specific |
| } | | |
| } | | |

Figure 4:
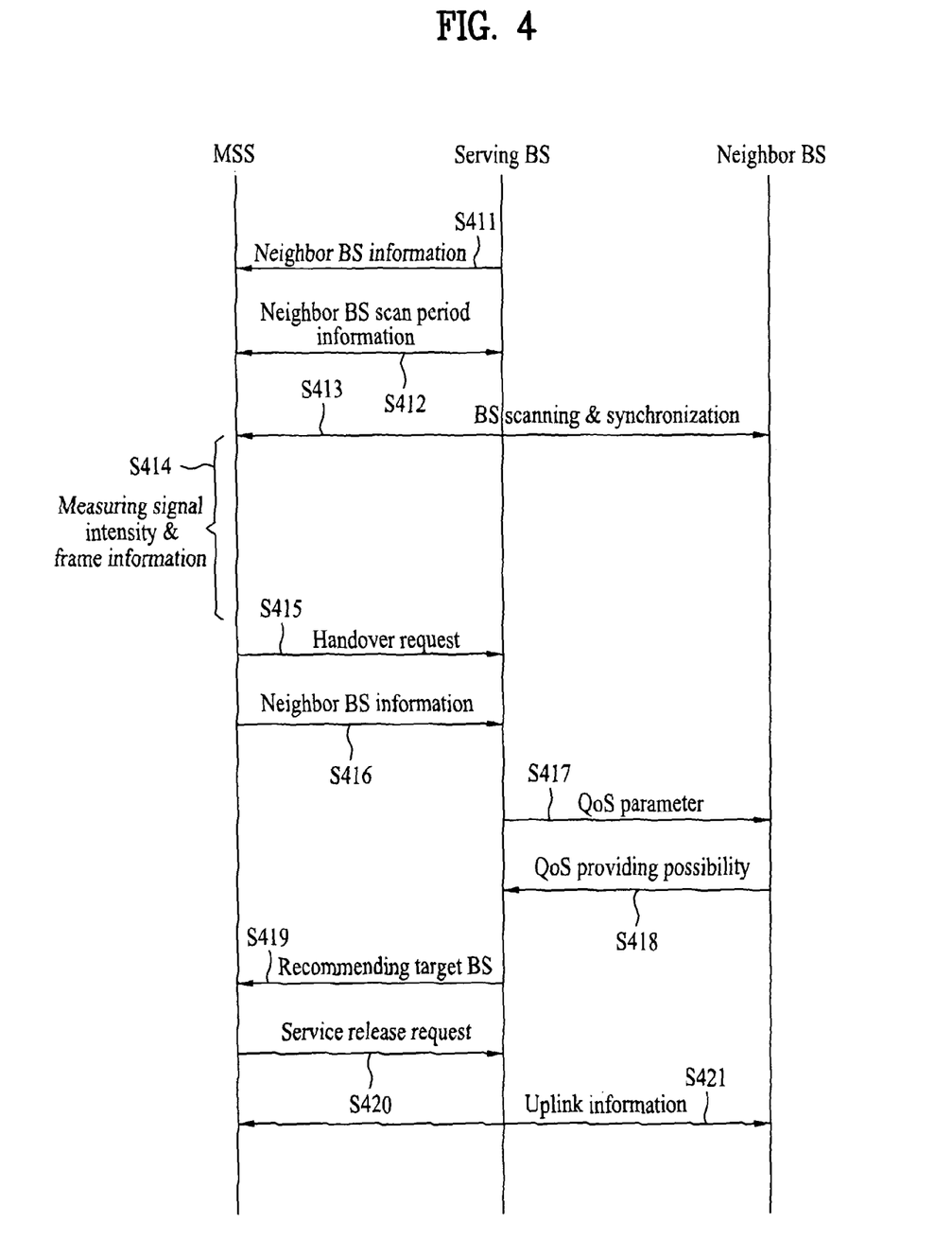
FIG. 4 is a flowchart of a neighbor base station information reporting method of a mobile subscriber station according to another embodiment.

FIG. 4 is a flowchart of a neighbor base station information reporting method of a mobile subscriber station according to another embodiment.

Referring to FIG. 4, once power of a mobile subscriber station is turned on, the mobile subscriber station receives neighbor base station information from a serving base station (S411) and receives information of a period enabling a scanning of a neighbor base station from the serving base station (S412).

The mobile subscriber station tunes synchronization to neighbor base stations (Target BSs) for the scanning period (S413) and acquires signal intensity and frame information (S414). The mobile subscriber station requests handover from the serving base station in case of deciding that there exists a necessity of the handover based on the measured signal intensity (S415).

The mobile subscriber station transmits the neighbor base station information acquired from tuning the synchronization to the neighbor base station to the serving base station before or after the handover (S416). The neighbor base station information can be delivered via a MAC (medium access control) management message.

The serving base station transmits a quality of service (hereinafter abbreviated QoS) parameter for a service providing sustain to the neighbor base stations according to the request from the mobile subscriber station (S417). The neighbor base station notifies the serving base station whether the QoS can be provided (S418).

The serving base station recommends a handover target base station (Target BS) to perform the handover to the mobile subscriber station according to the response received from the neighbor base station (S419). The mobile subscriber station having received the handover target base station recommending information requests a service release from the serving base station (S420). The handover target base station provides uplink information to the mobile subscriber station having performed the handover (S421) and executes a network re-registration procedure.

In the broadband wireless access system, the serving base station informs information of the neighbor base station to mobile subscriber stations within a cell via a broadcasting message. In doing so, the mobile subscriber station having measured the signal intensity of the neighbor base station can transmit the neighbor base station information to the serving base station via a message requesting a handover.

Figure 5:
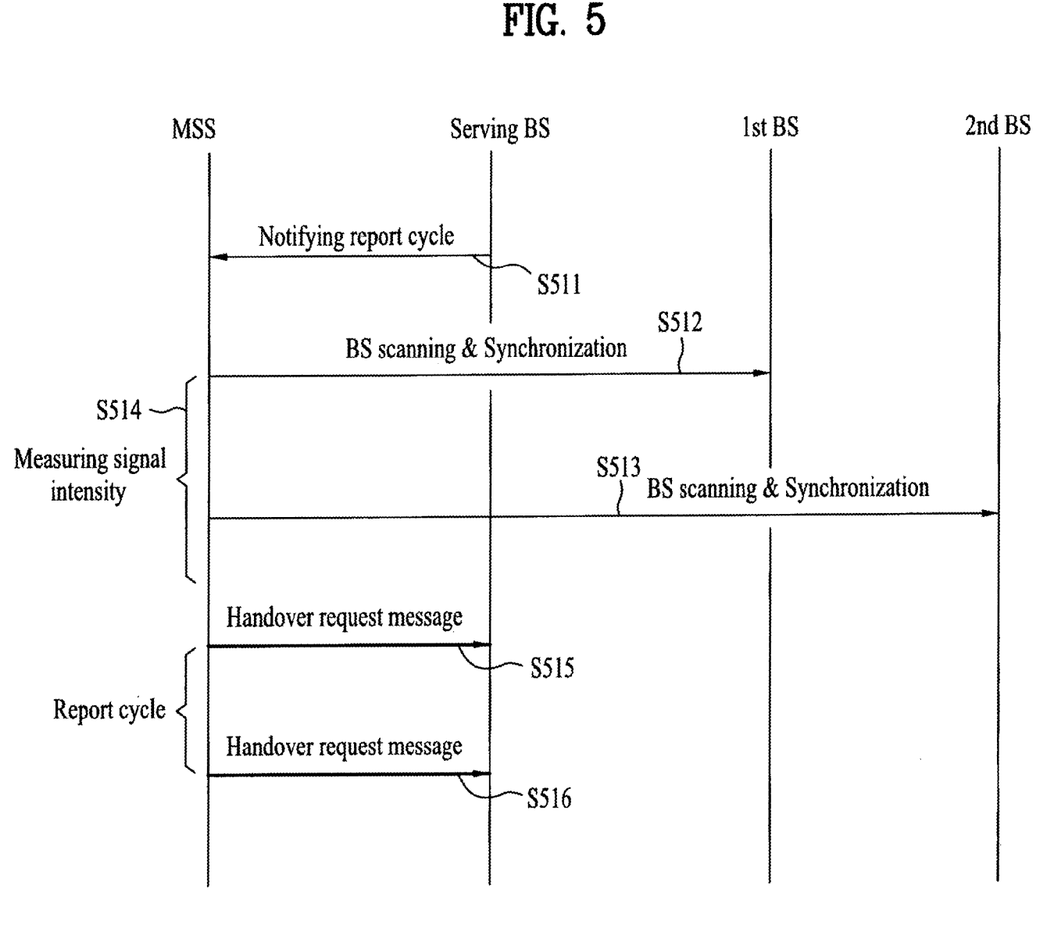
FIG. 5 is a flowchart of a neighbor base station signal intensity transmitting method according to a related art.

FIG. 5 is a flowchart of a neighbor base station signal intensity transmitting method according to a related art.

Referring to FIG. 5, a serving base station transmits information of a cycle to transmit a signal intensity of a neighbor base station to a mobile subscriber station (S511). The mobile subscriber station carries out scanning and synchronization on neighbor base stations (S512, S513). The mobile subscriber station measures the signal intensity of the neighbor base stations in the processes of the scanning and the synchronization (S514). The mobile subscriber station then transmits signal intensity information for the neighbor base stations to the serving base station by the cycle transmitted from the serving base station using a handover request message (S515, S516).

According to the above-explained method, in periodically transmitting the measurement of the signal intensity of the neighbor base station to the serving base station, the mobile subscriber station transmits the measurement information using the handover request message. Thus, the handover request message is used in reporting the signal intensity of the neighbor base station periodically, which is difficult to be distinguished from the handover request made by the mobile subscriber station. So, the base station needs to keep responding to the handover request message.

Figure 6:
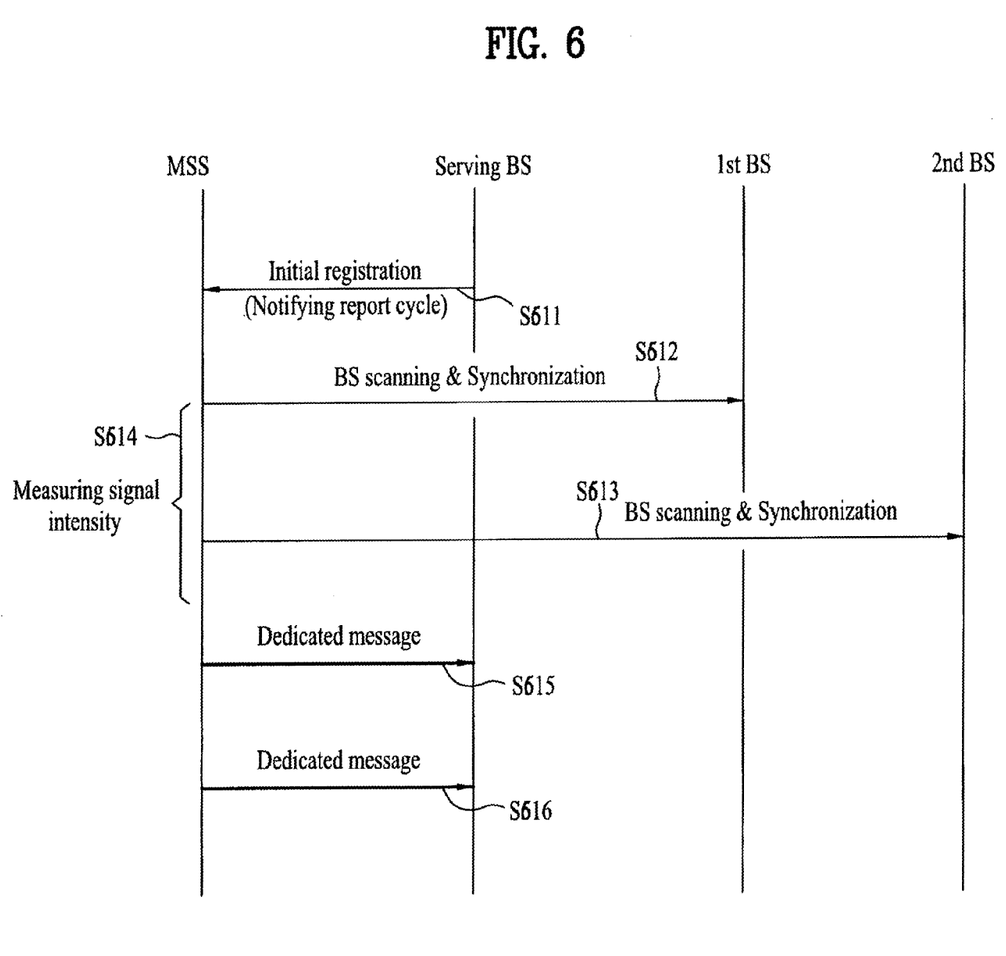
FIG. 6 is a flowchart of a neighbor base station signal intensity transmitting method according to one embodiment.

FIG. 6 is a flowchart of a neighbor base station signal intensity transmitting method according to one embodiment.

Referring to FIG. 6, a serving base station transmits information of a cycle to transmit a signal intensity of a neighbor base station to a mobile subscriber station (S611). The mobile subscriber station carries out scanning and synchronization on neighbor base stations (S612, S613). The mobile subscriber station measures the signal intensity of the neighbor base stations in the processes of the scanning and the synchronization (S614). The mobile subscriber station then transmits signal intensity information for the neighbor base stations to the serving base station by the cycle transmitted from the serving base station using a report message (S615, S616).

The report message is a medium access control (MAC) management message to transmit the signal intensity of the neighbor base station to the serving base station periodically and corresponds to a dedicated message to deliver signal information of the neighbor base station.

An example of the dedicated message to transmit the signal intensity of the neighbor base station is shown in

TABLE 2

| Syntax | Size | Notes |
|---|---|---|
| MSS-CINR-REP_Message_Format( ) { | | |
| Management Message Type=? | 8 bits | |
| For(j=0; j<N_NEIGHBORS; j++) { | | |
| Neighbor BS-ID | 48 bits | |

TABLE 2-continued

| Syntax | Size | Notes |
|---|---|---|
| BS CINR mean | 8 bits | |
| } | | |
| } | | |

Figure 7:
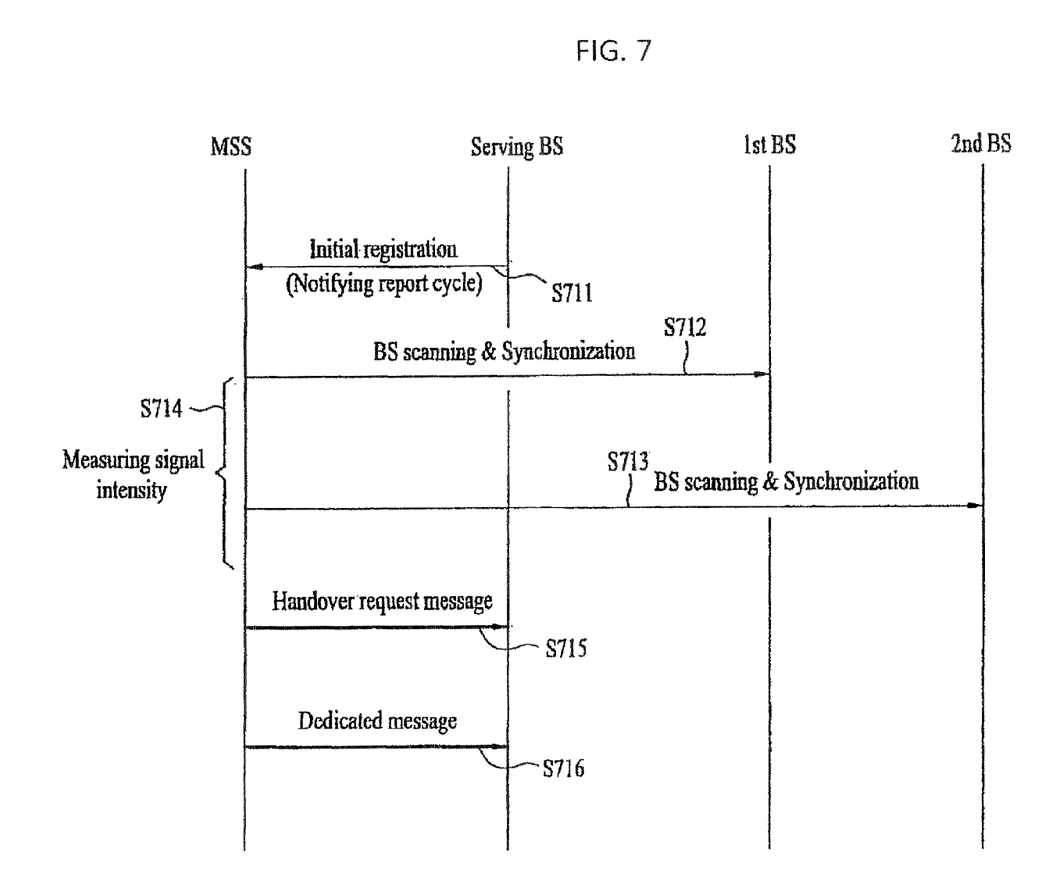
FIG. 7 is a flowchart of a neighbor base station signal intensity transmitting method according to another embodiment of the present invention.

FIG. 7 is a flowchart of a neighbor base station signal intensity transmitting method according to another embodiment of the present invention.

Referring to FIG. 7, a serving base station transmits information of a cycle to transmit a signal intensity of a neighbor base station to a mobile subscriber station (S711). The mobile subscriber station carries out scanning and synchronization on neighbor base stations (S712, S713). The mobile subscriber station measures the signal intensity of the neighbor base stations in the processes of the scanning and the synchronization (S714). In case that a special event such as a handover request message takes place (S715), the mobile subscriber station transmits signal intensity information of the neighbor base stations to the serving base station (S716).

INDUSTRIAL APPLICABILITY

Accordingly, the present invention, which is applicable to the broadband wireless access system, can efficiently transmit the neighbor base station signal intensity and frame information acquired by the mobile subscriber station.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of performing a handover operation by a mobile subscriber station in a broadband wireless access system, the method comprising:
   receiving, from a serving base station, information regarding a period during which scanning of at least one neighbor base station is enabled;
   acquiring neighbor base station information by scanning and synchronizing with the at least one neighbor base station during the period based on the received information;
   transmitting a handover request message to the serving base station;
   transmitting the neighbor base station information to the serving base station after the handover request message is transmitted, the neighbor base station information including a base station ID and physical frequency information for each of the at least one neighbor base station;
   receiving, from the serving base station, information regarding a recommended target base station for the handover operation after the neighbor base station information is transmitted; and
   transmitting a service release request message to the serving base station after the information regarding the recommended target base station is received,
   wherein the recommended target base station is determined by the serving base station based on communications relating to quality of service (QoS) communicated between the serving base station and the at least one neighbor base station, wherein the communications relating to QoS include: a parameter, transmitted from the serving base station to the at least one neighbor base station, indicating a certain QoS; and information, transmitted from the at least one neighbor base station to the serving base station, indicating whether the certain QoS can be provided.

2. The method of claim 1, further comprising:
receiving, from the serving base station, information indicating a cycle to report signal intensity information.

3. The method of claim 1, wherein the neighbor base station information includes information of only the base stations of the at least one neighbor base station for which a signal size is equal to or greater than a predetermined reference value.

4. The method of claim 1, wherein the neighbor base station information is transmitted via a dedicated message.

5. The method of claim 4, wherein the dedicated message comprises a medium access control (MAC) management message.

* * * * *